(12) United States Patent
Lai

(10) Patent No.: US 8,378,577 B2
(45) Date of Patent: Feb. 19, 2013

(54) LIQUID CRYSTAL DISPLAY WITH AMBIENT LIGHT SENSOR

(75) Inventor: Cheng-Yi Lai, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 330 days.

(21) Appl. No.: 12/822,265

(22) Filed: Jun. 24, 2010

(65) Prior Publication Data

US 2011/0156597 A1 Jun. 30, 2011

(30) Foreign Application Priority Data

Dec. 30, 2009 (TW) ................................ 98145862 A

(51) Int. Cl.
*H05B 37/02* (2006.01)
(52) U.S. Cl. .................. 315/149; 315/158; 362/97.2
(58) Field of Classification Search .................. 315/149, 315/291, 150, 157, 158, 307, 308; 362/615, 362/626, 627, 97.2, 97.4
See application file for complete search history.

(56) References Cited

U.S. PATENT DOCUMENTS

| 6,930,775 | B1 * | 8/2005 | Spremo et al. ............... 356/328 |
| 7,220,026 | B2 * | 5/2007 | Ko et al. ...................... 362/339 |
| 7,317,572 | B2 * | 1/2008 | Sekiguchi et al. ........... 359/457 |
| 2009/0213601 | A1 * | 8/2009 | Clugston, Jr. ................ 362/464 |
| 2009/0316274 | A1 * | 12/2009 | Lee et al. ..................... 359/634 |
| 2010/0195019 | A1 * | 8/2010 | Shinohara et al. ............. 349/62 |
| 2010/0277667 | A1 * | 11/2010 | Chang ............................ 349/62 |
| 2010/0283394 | A1 * | 11/2010 | Ong .............................. 315/158 |
| 2011/0109232 | A1 * | 5/2011 | Schulz et al. ................ 315/151 |

* cited by examiner

*Primary Examiner* — Thuy Vinh Tran
*Assistant Examiner* — Anthony Arpin
(74) *Attorney, Agent, or Firm* — Altis Law Group, Inc.

(57) ABSTRACT

A liquid crystal display includes a main body, a screen positioned on the main body, a backlight module positioned in the main body and supplying light for the screen, a controller for controlling the brightness of the backlight module and an ambient light sensor positioned on the main body. The ambient light sensor includes a barrel, an optical sheet positioned at an end of the barrel and a photosensitive unit positioned at the other end of the barrel. The photosensitive unit creates a signal according to the ambient light received via the optical sheet, and sends the signal to the controller. The controller adjusts the brightness of the backlight module. The optical sheet includes a first surface, a second surface opposite the first surface and a plurality of V-shaped micro structures formed on the first surface.

9 Claims, 3 Drawing Sheets

LIQUID CRYSTAL DISPLAY WITH AMBIENT LIGHT SENSOR

BACKGROUND

1. Technical Field

The present disclosure relates to liquid crystal displays and, particularly, to a liquid crystal display with ambient light sensor.

2. Description of the Related Art

There may be situations when it is desirable to use an ambient light sensor in a liquid crystal display in an environment where there is a significant amount of ambient light (e.g., the outdoors on a bright, sunny day). In some circumstances, a significant amount of ambient light may negatively affect the accuracy of an optical ambient light sensor. A typical ambient light sensor employed in the liquid crystal display usually includes a transparent sheet for protection. However, the light from an ambient light source at a side of the ambient sensor with an incident angle greater than the critical angle may be totally reflected at the bottom surface of the transparent sheet. That is, most of the ambient light cannot be received by the ambient sensor, thereby decreasing sensitivity of the ambient sensor.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the views, and both the views are schematic.

DETAILED DESCRIPTION

Figure 1:
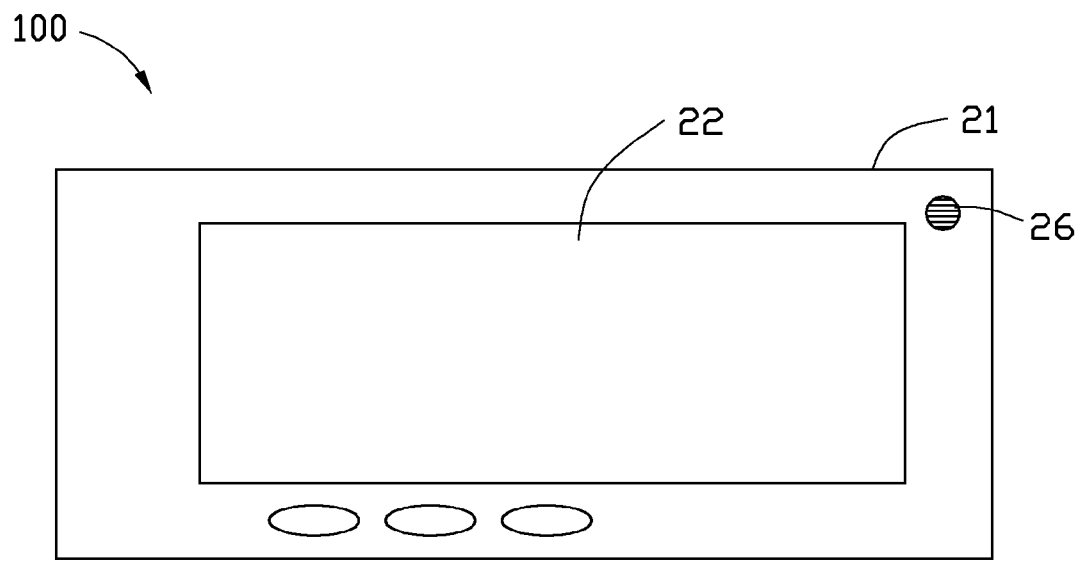
FIG. 1 is an isometric view of an embodiment of a liquid crystal display including an optical sheet.
Figure 2:
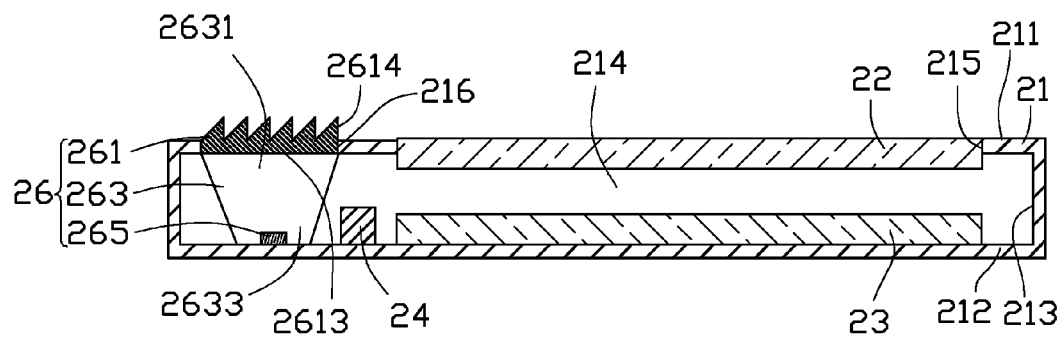
FIG. 2 is a cross-section of the liquid crystal display of FIG. 1.

Referring to FIGS. 1 and 2, an embodiment of a liquid crystal display 100 includes a main body 21, a screen 22, a backlight module 23, a controller 24 and an ambient light sensor 26. The main body 21 includes a top panel 211, a bottom panel 212 facing the top panel 211, and side walls 213 (only one shown) connecting the top panel 211 and the bottom panel 212. The top and bottom panels 211, 212 and the side walls 213 cooperatively define a receiving space 214 therebetween. The top panel 211 defines a first window 215 and a second window 216 each communicated with the receiving space 214.

The screen 22 is positioned on the main body 21 and mounted in the first window 215, and the backlight module 23 is positioned on the bottom panel 212 and located under the screen 22 in the main body 21. The backlight module 23 supplies light to the screen 22.

The ambient light sensor 26 is mounted to the main body 21 and includes an optical sheet 261, a barrel 263 and a photosensitive unit 265. The barrel 263 is sandwiched between the top panel 211 and the bottom panel 212 to face the second window 216. The optical sheet 261 is positioned in the second window 216 to connect or contact an end of the barrel 263. The photosensitive unit 265 is positioned on the second panel 212 and surrounded by the other end of the barrel 263. The optical sheet 261 includes a first surface 2611 (shown in FIG. 3), a second surface 2613 opposite to the first surface 2611, and a plurality of longitudinally parallel V-shaped micro structures 2614 formed on the first surface 2611 to protrude out from the top panel 211. The second surface 2613 is flat. A vertex angle of the V-shaped micro structure 2614 is preferably in a range from greater than 0° to about 90°. In the illustrated embodiment, the vertex angle of the V-shaped micro structure 2614 is 45°. The barrel 263 is substantially a frustum of a cone, including a first end portion 2631 and a second end portion 2633 with a diameter less than that of the first end portion 2631. The photosensitive unit 265 is mounted at the second end portion of the barrel 263, the optical sheet 261 is mounted at the first end portion of the barrel 263, and the V-shaped micro structure 2614 faces away from the photosensitive unit 265.

The ambient light sensor 26 is positioned in the main body 21 adjacent to the screen 22, with at least part of the optical sheet 261 exposed out of the main body 21. The photosensitive unit 265 receives light via the optical sheet 261, creates a signal based on brightness of the ambient light, and sends the signal to the controller 24. The controller 24 increases or decreases an electrical current of the backlight module 23 based on the received signal to adjust the brightness of the backlight module 23.

Figure 3:
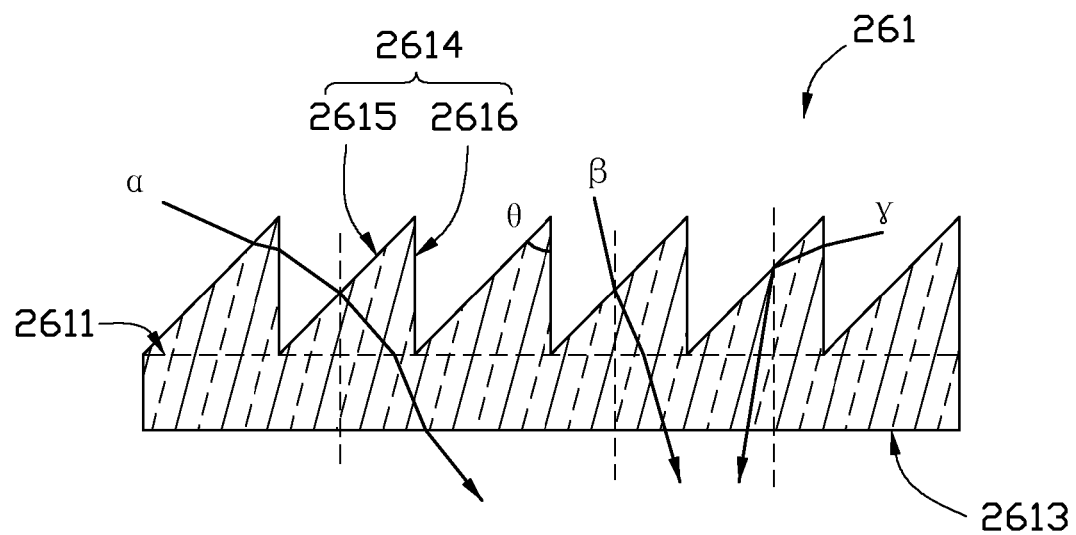
FIG. 3 is a partial cross-section of the optical sheet shown in FIG. 1 showing light paths.

Referring to FIG. 3, each V-shaped micro structure 2614 includes a first incident surface 2615 angled relative to the first surface 2611 and a second incident surface 2616 adjacent to the first incident surface 2615. The vertex angle θ is defined by the first incident surface 2615 and the second incident surface 2616. Light rays α, β and γ are refracted by the V-shaped micro structure 2614 towards a normal direction of the first surface 2611, and the incident angle of the light ray α, β and γ at the second surface 2613 is decreased, such that the internal reflection at the second surface 2613 is decreased. More light travels through optical sheet 261. The brightness of the backlight module 23 is adjusted by the controller 24 simultaneously.

Referring to Table 1, shown below, three test samples are provided, a first test sample of the ambient light sensor is made using a flat transparent sheet positioned on the first end portion 2631 instead of the optical sheet 261. The second test sample with ambient light sensor 261 with 10° vertex angle of V-shaped micro structure 2614. The third test sample with ambient light sensor 261 with 20° vertex angle of V-shaped micro structure 2614. Emitted light of predetermined incident angle travels through the three test samples, with the brightness (lumen) detected by the photosensitive unit 265 is also provided in each sheet of Table 1.

TABLE 1

| Incident angle | The first test sample | The second test sample | The third test sample |
| --- | --- | --- | --- |
| 10 | 184.96 | 212.63 | 213.52 |
| 20 | 103.57 | 146.87 | 162.79 |
| 30 | 47.69 | 66.25 | 99.67 |
| 40 | 17.22 | 23.91 | 41.18 |
| 50 | 7.53 | 13.36 | 18.27 |
| 60 | 3.44 | 7.32 | 8.86 |
| 70 | 1.15 | 3.55 | 4.59 |
| 80 | 0.11 | 1.26 | 2.25 |

Table 1 shows that the second and the third test samples with optical sheet 261 receive more light than the first sample. The photosensitive unit 265 of the third test sample with optical sheet 261 having vertex angle θ exceeding that of the second test sample receives more light than the third test sample. That is, as angle θ increases, more light passing through the optical sheet 261.

Finally, while particular embodiments have been described, the description is illustrative and is not to be construed as limiting. For example, various modifications can be made to the embodiments by those of ordinary skill in the art without departing from the true spirit and scope of the invention as defined by the appended claims.

What is claimed is:

1. A liquid crystal display comprising:
a main body;
a screen positioned on the main body;
a backlight module positioned in the main body and supplying light to the screen;
a controller for controlling brightness of the backlight module; and
an ambient light sensor positioned on the main body and comprising a barrel, an optical sheet positioned at an end of the barrel and a photosensitive unit positioned in the other end of the barrel and surrounded by the barrel, the optical sheet comprising a first surface away from the photosensitive unit, a second surface opposite to the first surface and a plurality of V-shaped micro structures formed on the first surface; wherein the photosensitive unit creates a signal according to the ambient light received via the optical sheet, and sends the signal to the controller, and then the controller adjusts the brightness of the backlight module accordingly.

2. The liquid crystal display of claim 1, wherein each V-shaped micro structure comprises a first incident surface angled relative to the first surface and a second incident surface perpendicular to the first surface.

3. The liquid crystal display of claim 1, wherein a vertex angle of each V-shaped micro structure is in a range from greater than 0° to 90°.

4. The liquid crystal display of claim 1, wherein a vertex angle of each V-shaped micro structure is 45°.

5. A liquid crystal display comprising:
a main body comprising a top panel, a bottom panel facing the top panel, and side walls connecting the top panel and the bottom panel, the top and bottom panels and the side walls cooperatively defining a receiving space therebetween, the top panel defining a first window and a second window both communicated with the receiving space;
a screen positioned in the first window of the top panel of the main body;
a backlight module positioned on the bottom panel of the main body and supplying light to the screen;
a controller positioned on the bottom panel adjacent to the backlight module for controlling brightness of the backlight module; and
an ambient light sensor comprising a barrel sandwiched between the top panel and the bottom panel, an optical sheet positioned in the second window and connected with an end of the barrel, and a photosensitive unit positioned on the second panel and surrounded by the other end of the barrel, the optical sheet comprising a first surface away from the photosensitive unit, a second surface opposite to the first surface and a plurality of V-shaped micro structures formed on the first surface; wherein the photosensitive unit creates a signal according to the ambient light received via the optical sheet, and sends the signal to the controller, and then the controller adjusts the brightness of the backlight module accordingly.

6. The liquid crystal display of claim 5, wherein each V-shaped micro structure comprises a first incident surface angled relative to the first surface and a second incident surface perpendicular to the first surface.

7. The liquid crystal display of claim 5, wherein a vertex angle of each V-shaped micro structure is in a range from greater than 0° to 90°.

8. The liquid crystal display of claim 5, wherein a vertex angle of each V-shaped micro structure is 45°.

9. The liquid crystal display of claim 5, wherein the V-shaped micro structures protrude out from the top panel.

* * * * *